US008128827B2

United States Patent
Gallo et al.

(10) Patent No.: US 8,128,827 B2
(45) Date of Patent: Mar. 6, 2012

(54) MODULAR OIL-BASED SLUDGE SEPARATION AND TREATMENT SYSTEM

(75) Inventors: Daniel Gallo, Katy, TX (US); Catalin Ivan, West University Place, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 12/620,180

(22) Filed: Nov. 17, 2009

(65) Prior Publication Data

US 2010/0059451 A1 Mar. 11, 2010

Related U.S. Application Data

(63) Continuation of application No. 11/860,202, filed on Sep. 24, 2007, now abandoned.

(51) Int. Cl.
*C02F 1/20* (2006.01)
*C02F 1/00* (2006.01)
*C02F 1/38* (2006.01)
*C02F 1/52* (2006.01)

(52) U.S. Cl. ........ 210/750; 210/766; 210/774; 210/806; 210/202; 210/241

(58) Field of Classification Search .................. 210/749, 210/750, 766, 774, 177, 178, 806, 241, 205, 210/206, 207, 209, 219, 252, 257.1, 258, 210/259; 175/66, 217, 218, 2, 206, 17
See application file for complete search history.

(56) References Cited

U.S. PATENT DOCUMENTS

| 5,006,239 | A | * | 4/1991 | Mishra | 210/181 |
| 5,176,798 | A | * | 1/1993 | Rodden | 202/159 |
| 5,470,458 | A | * | 11/1995 | Ripley et al. | 208/370 |
| 5,639,377 | A | * | 6/1997 | Banham et al. | 210/269 |
| 5,814,230 | A | * | 9/1998 | Willis et al. | 210/710 |
| 2004/0094483 | A1 | * | 5/2004 | Mueller | 210/723 |
| 2006/0273051 | A1 | * | 12/2006 | Ivan | 210/788 |

* cited by examiner

*Primary Examiner* — Nam Nguyen
*Assistant Examiner* — Lucas Stelling
(74) *Attorney, Agent, or Firm* — Patrick Traister; Kimberly Ballew; Sara K. M. Hinkley

(57) ABSTRACT

A method of recovering oil from oil-based sludge including the steps of homogenizing an oil-rich phase, a water-rich phase, and a solids-rich phase of an oil-based sludge, removing particulates from the oil-based sludge as the sludge traverses a shaker screen, heating the sludge, injecting a chemical into the heated sludge and mixing the chemical with the heated sludge, separating the phases of the chemically-treated sludge into a solids component stream, a water component stream, a first oil component stream, and a gas component stream, removing solids from the first oil component stream with a decanting centrifuge to form a second oil component stream, and removing water and solids from the second oil component stream with a disk stack centrifuge.

12 Claims, 7 Drawing Sheets

MODULAR OIL-BASED SLUDGE SEPARATION AND TREATMENT SYSTEM

CROSS REFERENCE TO RELATED APPLICATIONS

This application is a continuation of U.S. application Ser. No. 11/860,202, filed Sep. 24, 2007, the contents of which are incorporated herein by reference.

BACKGROUND OF INVENTION

Oil-based sludges of various types and consistencies are commonly generated as waste streams during oil or other hydrocarbon production processes. These sludges arise during well tests and initial production, as a by-product waste stream of hydrocarbon production, and as tank bottom sediments. The basic components of sludges are hydrocarbon oils of various consistencies, water, and solids of an inorganic and organic nature. Oil-based sludge typically refers to a complex water-in-oil emulsion stabilized by salts of organic compounds and fine solids. The oil phase contains a complex mixture of hydrocarbons of various consistencies including waxes and asphaltenes which may be solid or semi-solid at ambient temperature.

The chemistries of oil-based sludges and the relative proportions of the oil, water, and solid phases of sludges vary greatly and can change over time. To dispose of the waste, sludge is often stored in open pits where it may be left for considerable time before being treated. During such aging periods, the sludge or "pit sludge" undergoes overall chemical composition changes due to the effects of weathering, including: volatilization of lighter hydrocarbons; temperature induced crosslinking of hydrocarbons; addition of rain water; and, invariably, the introduction of a variety of other contaminants, particulates, and debris. In addition to a variable complex chemistry, oil-based sludge typically has a high solids content. Sludge solids normally include both high density and low density solids. High density solids, i.e., high gravity solids, may be large solids introduced into the drilling fluid during the drilling of a formation (e.g., formation solids, drill bits, etc.) or other solids that are relatively dense such as barite or hematite. While low density solids, i.e., low gravity solids, are those solids within the sludge that have a lower density or are relatively small fine solids (e.g., entrained solids such as sand).

Currently, treatment of sludge is a major operational cost for producers. Sludge is collected, stored, and then disposed of in tanks or delivered to a sludge pit. One challenge of sludge treating systems is that the recovery of marketable oil from the sludge is generally not cost-effective and thus not commercially viable. Due to wide variability in sludge composition, different sludge processing systems may be needed to optimize the processing of sludge for recovering oil of sufficient quality in a cost efficient manner. The quality of oil is frequently characterized by its Basic Sediment and Water (BS&W) content, in vol. %. The current marketable BS&W of recovered oil is less than about 2 vol. %. Furthermore, it is desirable to treat pit sludge to reduce the risk of contamination of the surrounding pit area, in accordance with increasingly strict environmental regulations, as well as decrease the overall waste volume, and ultimately to permit pit closure.

SUMMARY

The present invention is generally directed to a modular oil-based sludge separation and treatment apparatus that is easily adapted to provide processing flexibility in order to ensure quality oil recovery from oil-based sludge in an efficient and cost-effective manner. The modular approach allows the configuration of processing equipment to be adapted to the oil-recovery processing requirements of the particular oil-based sludge composition. Providing a customizable apparatus maximizes the quantity and quality of the recovered oil while minimizing the processing time and cost to the operator.

It is an objective of the present invention to provide a modular apparatus having certain processing equipment mounted on portable skids that are adaptable and versatile to permit customized arrangement for oil-recovery processing of a wide range of oil-base sludge compositions in a cost-efficient manner.

In one aspect, the invention is directed to a modular apparatus for recovering oil from oil-based sludge having a high concentration of low density solids. The modular apparatus includes: a pumping skid having a pump operable to homogenize an oil-based sludge; a shaker skid having a screen that removes particulates from the oil-based sludge as the sludge traverses the screen to form a debris-free sludge; a heating skid having a heat exchanger operable to heat the debris-free sludge as the debris-free sludge flows through the heat exchanger to form a heated sludge; a chemical skid having at least one chemical injection mixer operable to inject a chemical into the heated sludge and mix the chemical with the heated sludge to form a chemically-treated sludge; a phase separator skid having a three-phase separator operable to separate the phases of the chemically-treated sludge to form a first solids component stream, a first water component stream, a first oil component stream, and a first gas component stream; a decanter skid having a decanter centrifuge operable to remove solids from the first oil component stream to form a second solids component stream and a second oil component stream; and an oil purification skid having a disk stack centrifuge operable to remove water and solids from the second oil component stream to form a third solids component stream, a second water component stream, and a third oil component stream.

In another aspect, the invention is directed to a modular apparatus for recovering oil from oil-based sludge having a high concentration of high density solids. The modular apparatus includes: a pumping skid having a pump operable to homogenize an oil-based sludge; a shaker skid having a screen that removes particulates from the oil-based sludge as the sludge traverses the screen to form a debris-free sludge; a heating skid having a heat exchanger operable to heat the debris-free sludge as the debris-free sludge flows through the heat exchanger to form a heated sludge; a first chemical skid having at least one chemical injection mixer operable to inject a chemical into the heated sludge and mix the chemical with the heated sludge to form a first chemically-treated sludge; a decanter skid having a decanter centrifuge operable to remove solids from the first chemically-treated sludge to form a first solids component stream and a decanter-processed sludge; a second chemical skid having at least one chemical injection mixer operable to inject a chemical into the decanter-processed sludge and mix the chemical with the decanter-processed sludge to form a second chemically-treated sludge; a phase separator skid having a three-phase separator operable to separate the phases of the second chemically-treated sludge to form a second solids component stream, a first water component stream, a first oil component stream, and a first gas component stream; and an oil purification skid having a disk stack centrifuge operable to remove water and solids from the first oil component stream to form a third solids component stream, a second water component stream, and a second oil component stream.

In still another aspect, the invention is directed to a modular apparatus for recovering oil from oil-based sludge having very low solids content. The modular apparatus includes: a pumping skid having a pump operable to homogenize an oil-based sludge; a shaker skid having a screen that removes particulates from the oil-based sludge as the sludge traverses the screen to form a debris-free sludge; a heating skid having a heat exchanger operable to heat the debris-free sludge as the debris-free sludge flows through the heat exchanger to form a heated sludge; a chemical skid having at least one chemical injection mixer operable to inject a chemical into the heated sludge and mix the chemical with the heated sludge to form a chemically-treated sludge; a phase separator skid having a three-phase separator operable to separate the phases of the chemically-treated sludge to form a first solids component stream, a first water component stream, a first oil component stream, and a first gas component stream; and an oil purification skid having a disk stack centrifuge operable to remove water and solids from the first oil component stream to form a second solids component stream, a second water component stream, and a second oil component stream.

These and other features are more fully set forth in the following description of preferred or illustrative embodiments of the disclosed and claimed subject matter.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIGS. 4 and 6 are schematics of an exemplary modular apparatus for separating and treating an oil-base sludge having a high concentration of high density solids to recover the valuable hydrocarbon component, in accordance with the skid arrangement shown in FIG. 2; and FIGS. 4 and 7 are schematics of an exemplary modular apparatus for separating and treating an oil-base sludge having very low solids content to recover the valuable hydrocarbon component, in accordance with the skid arrangement shown in FIG. 3.

DETAILED DESCRIPTION

Figure 1:
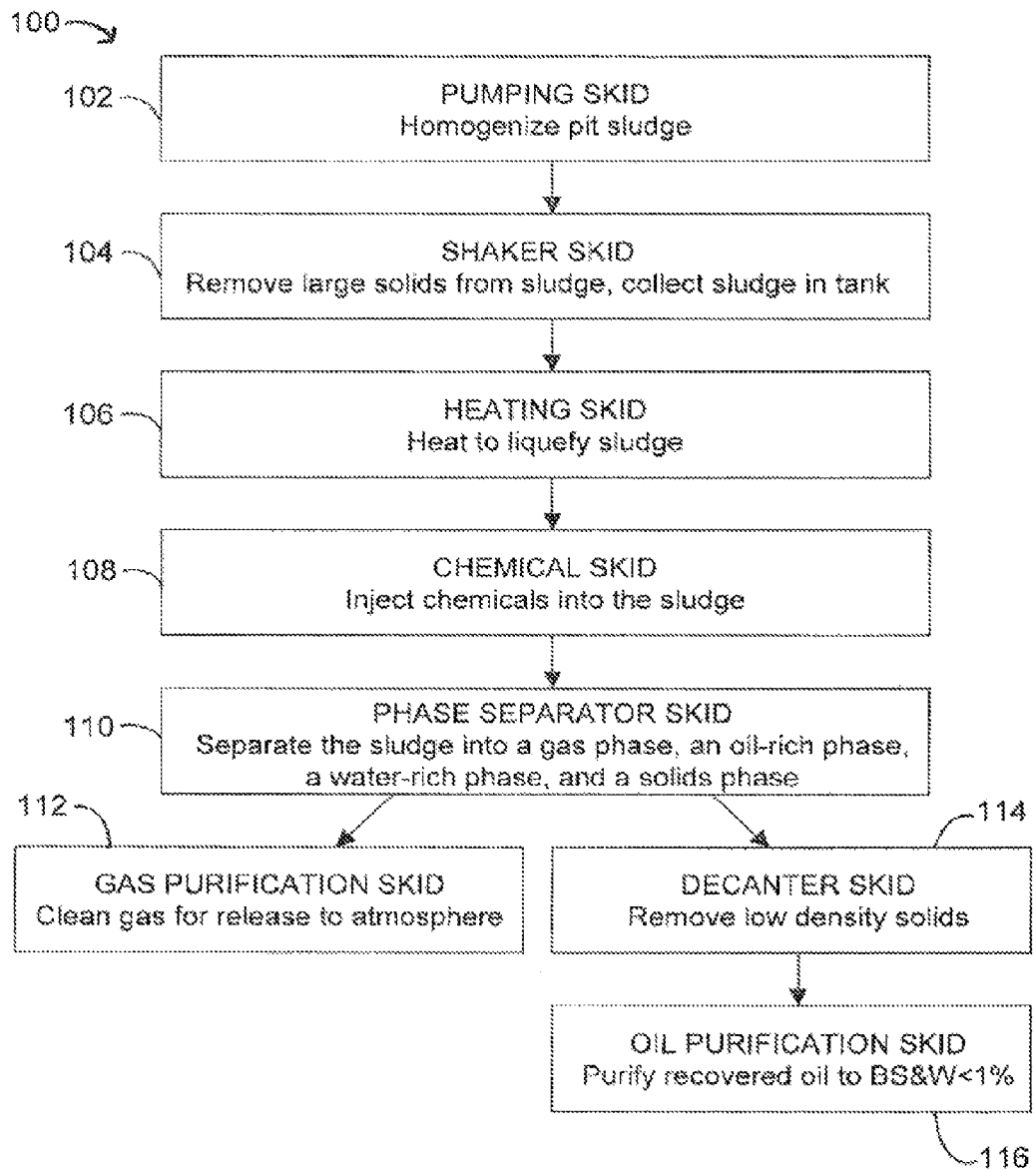
FIG. 1 is a flow chart depicting a modular skid arrangement optimized for recovering the valuable hydrocarbon component of pit sludge having a high concentration of low density solids, according to an embodiment of the invention.
Figure 2:
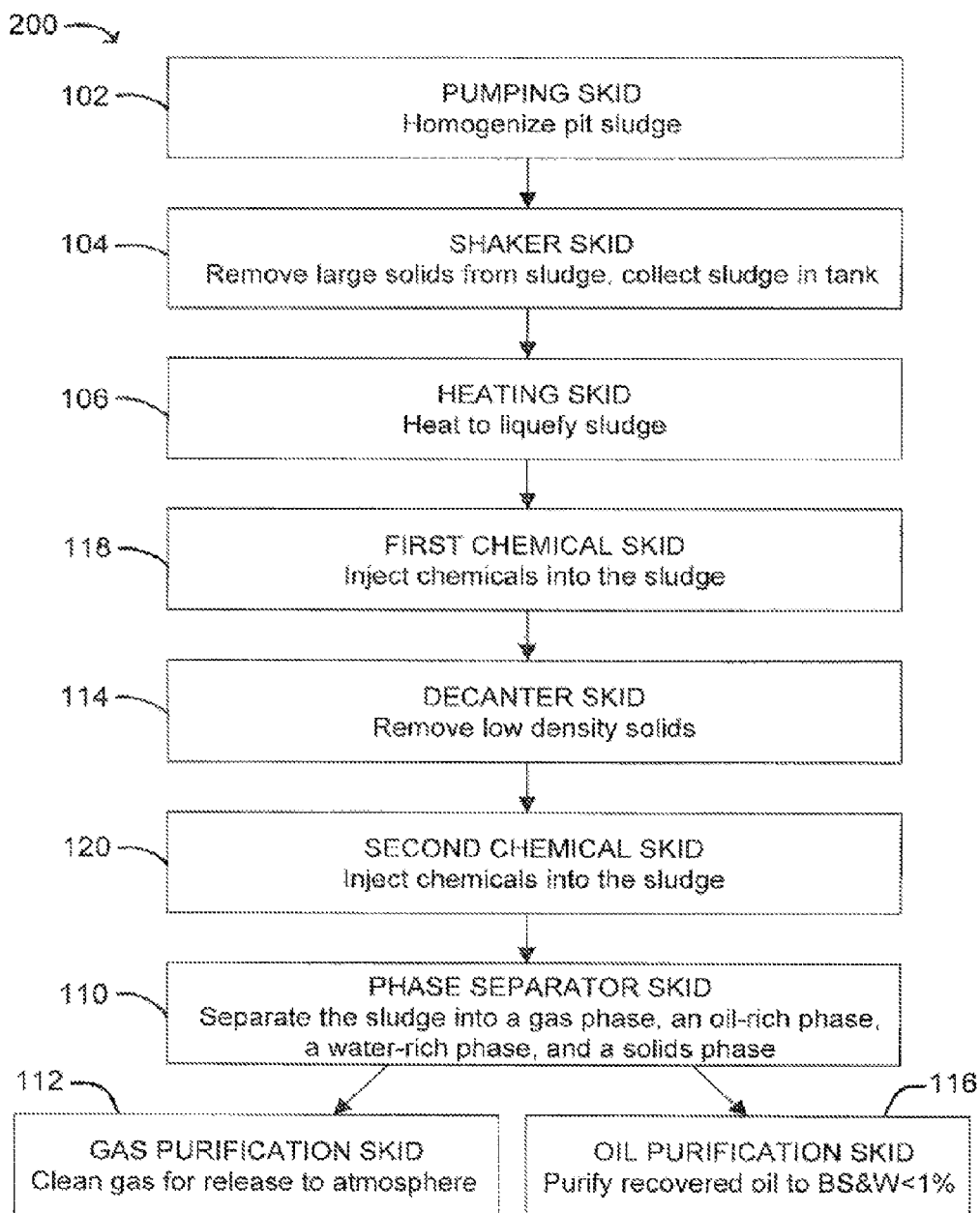
FIG. 2 is a flow chart depicting another modular skid arrangement optimized for recovering the valuable hydrocarbon component of pit sludge having a high concentration of high density solids, according to another embodiment of the invention.
Figure 3:
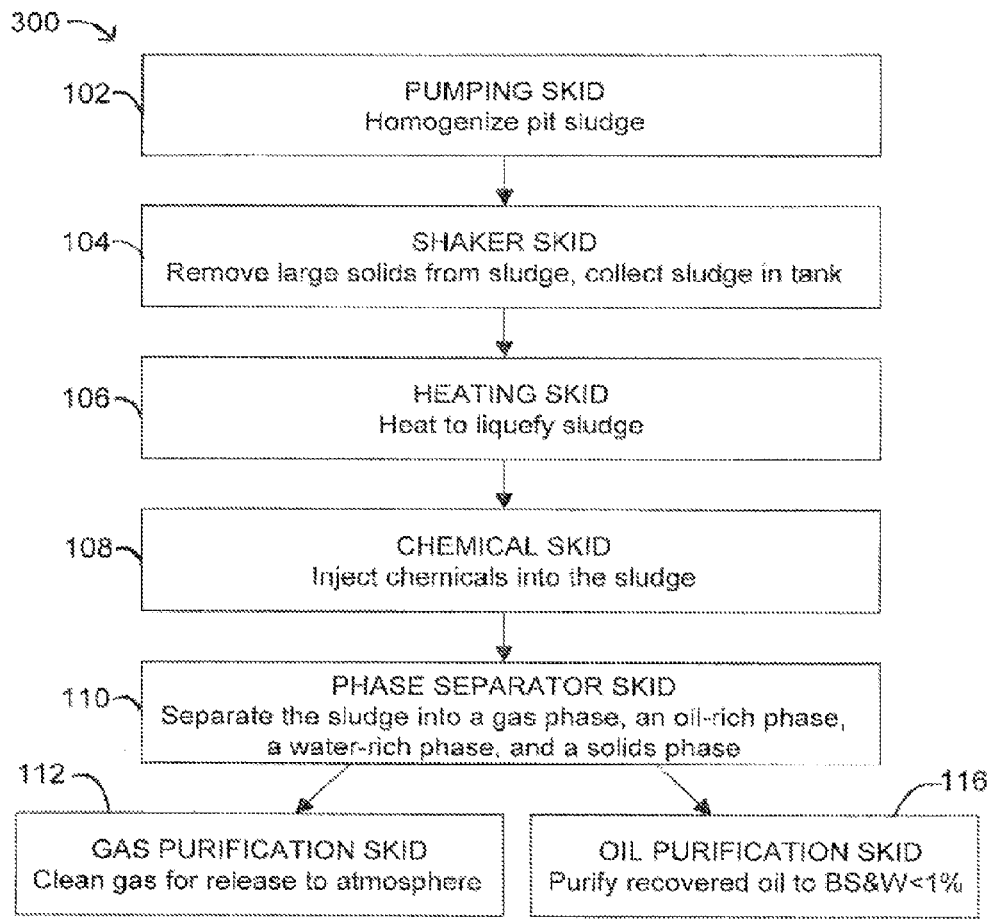
FIG. 3 is a flow chart depicting still another modular skid arrangement optimized for recovering the valuable hydrocarbon component of pit sludge having very low solids content, according to still another embodiment of the invention.

The claimed subject matter relates to a modular apparatus having one of several skid arrangements depicted in FIGS. 1-3 for recovering the valuable hydrocarbon component of oil-based sludges having a wide variability in sludge composition. Depending upon the particular sludge composition and its solids content, the skid arrangements of the modular apparatus of the present invention may be easily configured, and re-configured, in order to optimize the separation and purification of the recovered oil while minimizing the time and cost to an operator.

According to an embodiment of the invention, FIG. 1 depicts the skid arrangement of a modular apparatus 100 optimally configured for recovering the valuable hydrocarbon component of sludge 14 initially having a high concentration of low density solids. Modular apparatus 100 comprises a pumping skid 102, a shaker skid 104, a heating skid 106, a chemical skid 108, a phase separator skid 110, a gas purification skid 112, a decanter skid 114, and an oil purification skid 116. Each of the skids 102-116 are described in more detail in the description that follows with respect to the modular apparatus 100 schematically illustrated in FIGS. 4 and 5.

Figure 4:
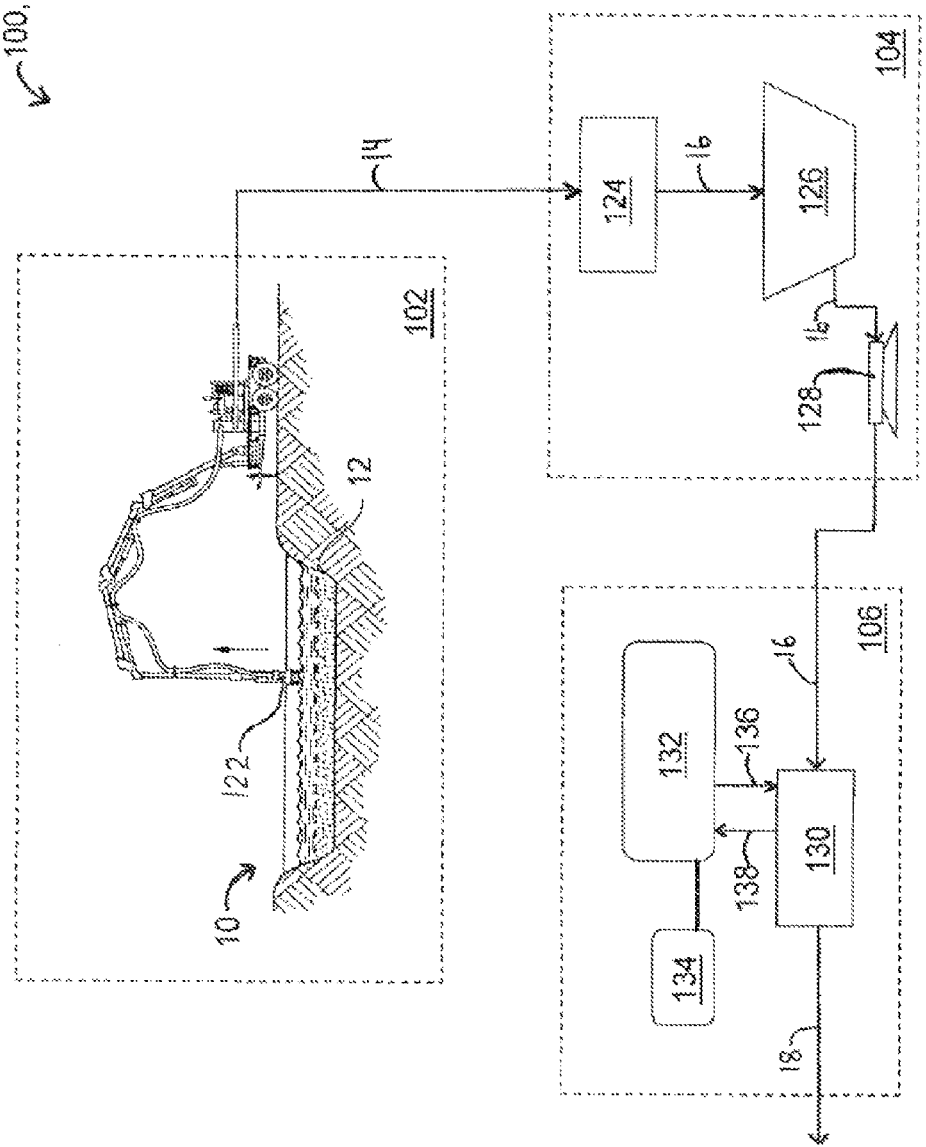
FIGS. 4 and 5 are schematics of an exemplary modular apparatus for separating and treating an oil-base sludge having a high concentration of low density solids to recover the valuable hydrocarbon component, in accordance with the skid arrangement shown in FIG. 1.
Figure 5:
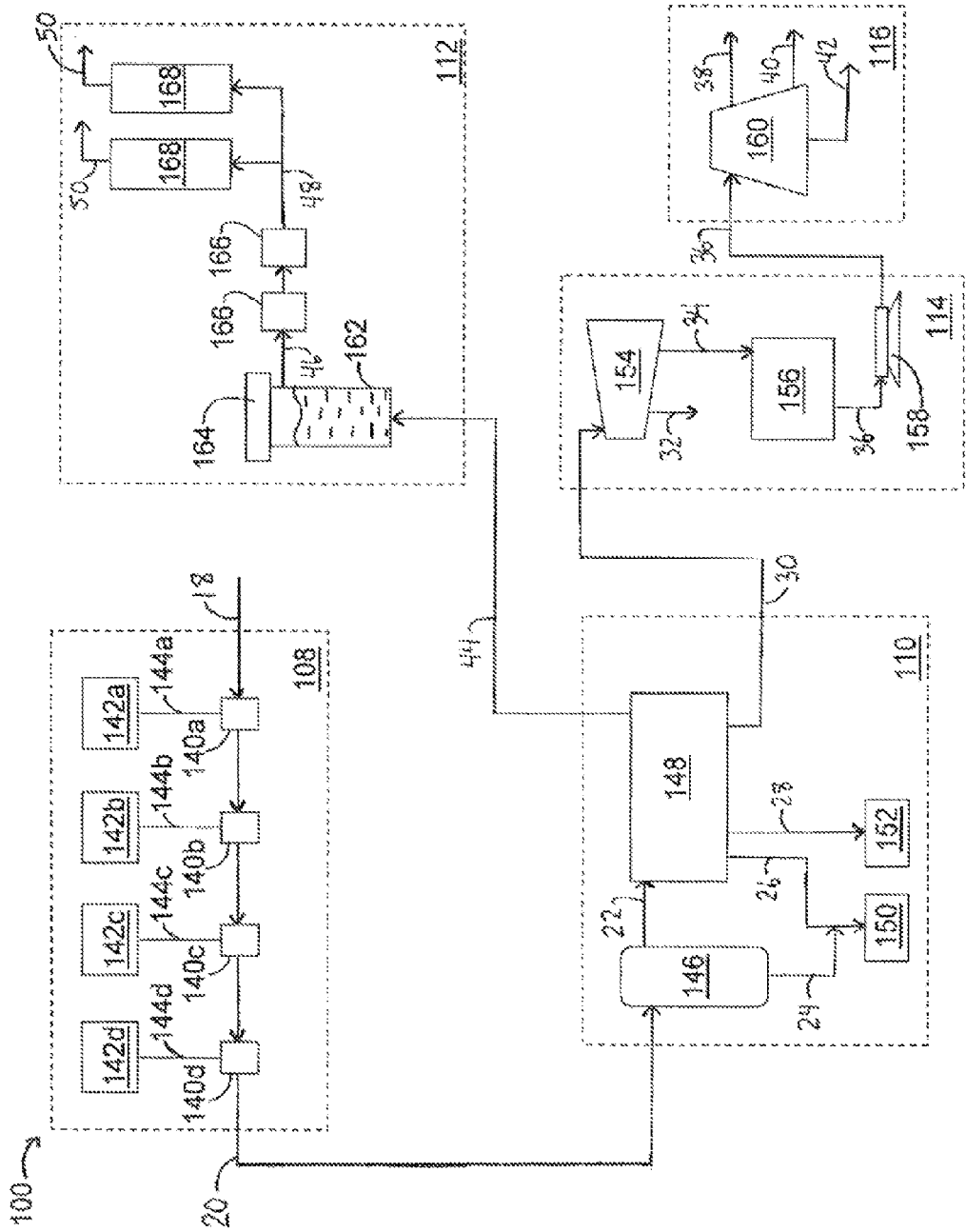

As illustrated in FIGS. 4 and 5, modular apparatus 100 processes pit sludge through the pumping skid 102, the shaker skid 104, the heating skid 106, the chemical skid 108, the phase separator skid 110, the gas purification skid 112, the decanter skid 114, and the oil purification skid 116. Referring to FIG. 4, the pumping skid 102 includes a hydraulic submersible sludge pump 122 that homogenizes a pit sludge 10 contained in a pit 12 and then pumps a homogenized sludge 14 to the shaker skid 104. The pump 122 may be mounted on a hydraulic arm in order to reach inner areas of the pit 12. During ageing, the pit sludge 10 separates into basically three layers or phases, wherein the top layer of the pit is an oil-rich phase, the middle layer of the pit sludge 10 is a water-rich phase, and the bottom layer of the pit sludge 10 is a solids-rich phase. The pump 122 forms a homogeneous mixture or slurry of the three phases contained within the pit in order to provide a generally constant feed composition to the remainder of the apparatus 100 for processing.

The shaker skid 104 includes a shaker screen 124 and a holding tank 126 mounted thereon and within the confines of the area in the skid 104 so as to maintain portability of the skid 104. The shaker screen 124 physically separates and removes large particulates such as stones or debris from the sludge 14. A debris-free sludge 16 exiting the shaker screen 124 collects in the holding tank 126. Holding tank 126 may be essentially any type of tank that can contain a sufficient amount of sludge to supply and maintain a constant sludge flow rate to a heat exchanger 130. A first transfer pump 128 in fluid communication with the holding tank 126 transfers the sludge 16 from the holding tank 126 to the heating skid 106. In a preferred embodiment, the holding tank 126 is an augured V-Tank coupled to the pump 128 which is VFD (variable frequency driver) controlled in order to automatically provide a steady state flow rate of the sludge 16 to the heat exchanger 130.

The heating skid 106 has the heat exchanger 130, a steam boiler 132, and a fuel tank 134 mounted thereon and within the confines of the area of the skid 106 so as to maintain the portability of the skid 106. Sludge 16 is heated to a desired temperature as it travels through the heat exchanger 130.

Because oil-based sludges often include waxy hydrocarbons, heating advantageously melts the waxy hydrocarbons into liquid form and lowers the viscosity of the sludge 16. Also, heating advantageously aids in breaking the emulsion (secondary phase) and promotes phase separation within the sludge 16. Providing heat to the heat exchanger 130 is accomplished by use of the steam boiler 132. The steam boiler 132 generates steam and circulates the steam to the heat exchanger 130 via a first steam line 136 and a second steam line 138. The flow rate, pressure, and temperature of the steam entering the heat exchanger 130 via line 136 are controlled so as to provide adequate heat transfer to the sludge 16 as it flows through the heat exchanger 130. A heated sludge 18, having the desired temperature and viscosity, exits the heat exchanger 130 and is subsequently transferred to the chemical skid 108. In one example, the type of heat exchanger 130 used is a spiral type heat exchanger, wherein sludge 16 flows through the heat exchanger 130 in a path separate from that of the steam, but adjacent to it such that heat from the steam is transferred to the sludge 16. It is understood that other types of heat exchangers can be used without departing from the scope of this invention.

Depending upon the particular sludge composition, the sludge 16 is heated to essentially any temperature sufficient to liquefy the sludge 16 and lower its viscosity. When the viscosity is lower, treatment chemicals may be more easily blended with the heated sludge 18 in downstream processing. Furthermore, when the sludge viscosity is lower, entrained solids are more easily released in downstream processing. The desired temperature of the heated sludge 18 and its corresponding rheological profile can be predetermined and optimized using a viscometer, such as an oilfield Fann 35 viscometer available from Fann Instrument Co. In one example, sludge 18 is heated to a temperature in the range from about 65° C. to about 85° C. to sufficiently liquefy the sludge 18 and reduce its viscosity for downstream processing. More preferably, sludge 18 is heated to a temperature in the range from about 70° C. to about 80° C. Although it is desirable to heat the sludge 16, care should be taken to ensure that the temperature of the heated sludge 18 is lower than the flash point temperature of the sludge 16. The flash point is that minimum temperature at which there is enough evaporated fuel in the air to start combustion. The flash point of the sludge 16 can be determined by the use of a flash-point measuring device such as the Pensky Martens Closed Cup according to method ASTM D93B.

Preferably, the fuel tank 134 is co-located on the skid 106 to provide fuel to the steam boiler 132 for heating the steam. Optionally, a power supply (not shown) is provided on the skid 106 to actuate valves (not shown) that regulate the flow rate of the steam through the first and second steam lines 136, 138, and also regulate the flow rates of the water supply and the fuel provided to the steam boiler 132. A control panel (not shown) may be co-located on the skid 106 to monitor and automatically control the valves in order to automate the heating process at the heat exchanger 130. In addition, the boiler 132, flow lines 136, 138, and heat exchanger 130 are preferably thermally insulated to better maintain temperature uniformity and control.

Once heated, the sludge 18 is transferred to a chemical skid 108 for chemically altering the sludge 18 to break up the emulsion and promote phase separation. The chemical skid 108 includes a plurality of chemical injection mixers 140*a-d* and chemical supply tanks 142*a-d* mounted thereon and within the confines of the area of the skid 108 so as to maintain the portability of the skid 108. Chemical addition is typically required to destabilize the emulsion and change such properties to enhance separation of the water and solids from the sludge 18, as well as decrease the separation time required. Each of the chemical injection mixers 140*a-d* includes a static shear mixer having an injection point. The injection point introduces a chemical into the sludge 18 while the mixer simultaneously blends the chemical and the sludge 18 under the shearing action of the mixer. The chemical injection mixer advantageously provides a homogeneous distribution of the chemical within the sludge 18 to aid in its complete and efficient chemical reaction therein. As depicted in FIG. 5, four chemicals are added to the heated sludge 18 as the sludge is directed through the chemical injection mixers 140*a-d*. Each of the chemical injection mixers 140*a-d* has a corresponding chemical supply tank 142*a-d* for storing the chemicals until they are transferred via chemical lines 144*a-d* to the mixers 140*a-d* for injection into the sludge 18. Once all the chemicals are introduced and blended into the heated sludge 18, a chemically-treated sludge 20 exits the last chemical injection mixer 140*d* and is subsequently transferred to the phase separator skid 110 for further processing.

Depending upon the particular initial sludge 14 composition, a wide variety of chemicals, may be introduced and blended into the sludge 18 in order facilitate subsequent processing to separate the solid, water, and oil phases of the chemically treated sludge 20. Suitable chemicals include acids, demulsifiers, wetting agents, surfactants, flocculants, and defoamers. Demulsifiers modify the interfacial tension of the emulsion film to release the water and assist in separating out the water from the oil. Wetting agents alter the wetability of solid particles thereby causing the solid particles to become hydrophilic which increases the solids affinity for water and causes further breakup of the interfacial emulsion film. Flocculants induce the solids to aggregate and form larger solids to facilitate separation of the solids in the sludge. In one example, as the heated sludge 18 travels through the first injection mixer 140*a*, the mixer 140*a* injects an acid and blends the acid with the sludge 18 therein in order to neutralize adsorbed ions present at the interfacial emulsion film of the sludge 18 and chemically prepare the sludge 18 for chemical treatment with a demulsifier. Subsequently, the sludge 18 is directed through the second injection mixer 140*b* wherein a demulsifier is injected and blended into the sludge 18 to break the interfacial emulsion film for release of the secondary water phase. The sludge 18 then passes through the third injection mixer 140*c* wherein a wetting agent is injected and blended into the sludge to alter the affinity of the solids towards the water phase. Afterwards, the sludge 18 passes through the fourth injection mixer 140*d* wherein a defoamer is injected and blended into the sludge for the purpose of counteracting surfactants (detergents) present in the sludge that may otherwise undesirably cause foaming. After chemical treatment in injection mixers 140*a-d*, a chemically-treated sludge 20 exits the chemical skid 108 and is ready for subsequent processing. It should be noted that the present invention is not intended to be limited to the use of any particular chemicals, and other chemicals may be substituted for any of the aforementioned chemicals.

Furthermore, additional chemicals may be incorporated into the sludge 18 by providing additional injection mixers (e.g., 140*e-n*) on the skid 108 such that all the desired chemicals may be introduced into the sludge. For example, a fifth injection mixer (not shown) may be included on skid 108 to introduce a pour point suppressant into the sludge 18 in order to extend the fluidity of the sludge to lower temperatures. Because wax in the sludge can cause issues for pumping and phase separation in terms of the high viscosity it imparts and coating of entrained solids, pour point suppressants can be added to depress the temperature at which wax molecules in the oil phase of the sludge 18 solidify. Conversely, in another example, fewer chemicals may be incorporated into the sludge 18 by bypassing one or more of the injection mixers 140a-d or, alternatively, removing one of more of the mixers 140a-d from the skid 108.

Preferably at least one dosing pump (not shown) in fluid communication with each of the chemical injection mixers 140a-d is used to provide a predetermined quantity of chemical to the injection point of the mixer for introduction into the sludge 18. The quantity of each of the chemicals introduced into the sludge 18 depends upon the particular initial sludge composition 14. For example, a dosing pump in fluid communication with the second injection mixer 140b provides demulsifier in the predetermined amount of 2-3% by volume of sludge 18. Although essentially any type of dosing pump may be used, in one example each of the dosing pumps is a gear pump with a VFD control panel. In addition, preferably, the chemical injection mixers 140a-d are thermally insulated to better maintain the sludge temperature and fluidity.

After chemical treatment, the sludge 20 is directed to the phase separator skid 110 for separating the solid, water, oil, and gas phases of the sludge 20. The phase separator skid 110 includes a surge tank 146 and a three-phase separator 148 mounted thereon and within the confines of the area of the skid 110 so as to maintain the portability of the skid 110. The sludge 20 is fed into the vertically-oriented surge tank 146 which separates heavier solids from the sludge 20 and provides a continuous flow of a liquid portion of the sludge 22 to the three-phase separator 148. The surge tank 146 contains an interior plate that facilitates the small solids (e.g., solids in suspension) within the sludge 20 to aggregate and form larger solids such that gravity is sufficient to separate these heavier solids out of the sludge 20. Separated solids 24 that settle and accumulate in a bottom region of the surge tank 146 are discharged and directed to a solids receiving tank 150. The liquid portion of the sludge 22, which comprises oil, water, gas, and fine solids, is directed to the three-phase separator 148.

The liquid portion of the sludge 22 flows into the three-phase separator 148 through an inlet located at one end of the separator 148. The separator 148 is designed to separate the phases and flow the separated phases to their respective outlets. Within the retention section of the three-phase separator 148, the liquid portion of the sludge 22 separates into a water-rich phase 28, an oil-rich phase 30, and a gas phase 44. Furthermore, additional solids 26 that may settle out of the sludge 22 and accumulate in a bottom region of the separator 148, primarily as a result of the re-distribution or separation of the phases, are discharged and directed to the solids receiving tank 150. The water-rich phase 28 is discharged to a water tank 152. The oil-rich phase 30 is transferred to the decanter skid 114 for fine solids removal. The gas phase 44 is directed to the gas purification skid 112 to clean the gas for release into the atmosphere. One exemplary three-phase separator 148 is the Horizontal Longitudinal Flow Separator commercially available from NATCO Group Inc., Houston, Tex. However, the present invention is not limited to a particular type of surge tank or three-phase separator. In addition, the surge tank 146 and three-phase separator 148 are both preferably insulated to better maintain the sludge temperature and fluidity.

The oil-rich phase 30 is transferred to the decanter skid 114 to separate the fine solids out of the oil-rich phase 30. The decanter skid 114 includes a decanter centrifuge 154 and a heating tank 156 mounted thereon and within the confines of the area of the skid 114 so as to maintain the portability of the skid 114. For the removal of solids, the decanter centrifuge 154 is particularly useful in reducing the solids content in liquids having a solids concentration in excess of about 3 vol. % to a solids concentration less than about 2 vol. %. Once the oil-rich phase 30 is fed into the decanter centrifuge 154, centrifugal force causes suspended solids to separate out of the oil-rich phase 30 and coalesce for subsequent removal from the decanter. Solids 32 are discharged through a solids outlet located in the bottom of the decanter centrifuge 154. At this point in the processing, a decanter-processed oil-rich phase 34 that exits the decanter 154 has a BS&W of less than about 2 vol. %. Suitable decanter centrifuges include decanter centrifuges having a rotational speed of 3000 rpm or greater. Exemplary decanter centrifuges include Model 500 (3000 rpm) and Model 518 (5000 rpm) commercially available from M-I L.L.C., Houston, Tex.

After the fine solids removal, the decanter-processed oil-rich phase 34 is transferred to the heating tank 156 and optionally heated therein. Because a significant amount of cooling can occur during the various prior processing steps, since being previously heated in the heat exchanger 130, the oil-rich phase 34 is optionally heated to a desired temperature in the heating tank 156 in order to enhance its final phase separation and purification during the next processing step at the oil purification skid 116. The heating tank 156 includes a heating element (e.g., a steam coil) capable of heating the contents of the tank 156. After heating, a heated oil-rich phase 36 is pumped via a second transfer pump 158 to the oil purification skid 116 for final purification. In one example, the heated oil-rich phase 36 is heated to a temperature in the range from about 65° C. to about 85° C.

The heated oil-rich phase 36 is transferred to the oil purification skid 116 for its final purification and recovery of oil therefrom having a BS&W of less than about 1 vol. %. The oil purification skid 116 includes a disk stack centrifuge 160. As depicted in FIG. 5, the heated oil-rich phase 36 is fed into the disk stack centrifuge 160 to further purify the oil. The disk stack centrifuge uses a combination of plates (i.e., the disk stack) and extremely high centrifugal forces to separate the very fine water emulsion and the ultra-fine solids out of the oil-rich phase 36. After separation, a water stream 38, a recovered oil stream 40, and an ultra-fine solids phase 42 are discharged from the centrifuge 160. After final processing in the disk stack centrifuge 160, the recovered oil stream 40 has a BS&W less than about 1 vol. % and is commercially marketable. Exemplary disk stack centrifuges are commercially available from Alfa Laval Inc., Richmond, Va.

The gas phase 44 is transferred to the gas purification skid 112 where the gas phase 44 is treated to remove volatile organic compounds (VOCs) prior to discharge into the environment. The gas purification skid 112 preferably includes a free water knockout pot 162, at least one mist impinger 166, and at least one activated carbon filter 168 mounted thereon and within the confines of the area of the skid 112 so as to maintain the portability of the skid 112. A VFD-controlled vacuum blower 164 attached to the knockout pot 162 is used to draw the gas phase 44 from a gas vent located in an upper side of the three-phase separator 148 through the knockout pot 162 filled with water. The gas phase 44 enters a gas inlet located near the bottom of the knockout pot 162, and hydrocarbons in the gas phase 44 adhere to the water as the gas travels upwardly through the pot 162. Water in the knockout pot 162 is periodically emptied into a liquid waste disposal and replaced with fresh water. Because the exiting gas is saturated with water, a wet-gas 46 that exits a gas outlet near the top of the knockout pot 162 is directed through at least one mist impinger 166 to remove water from the gas 46 and provide a dry gas 48. The dry gas 48 that exits the at least one mist impinger 166 is then transferred to an activated carbon filter 168 to remove contaminants (e.g., remaining VOCs) therefrom in order to ensure a gas 50 that meets the environmental regulatory standards for release to the atmosphere. In one example, as depicted in FIG. 5, the knockout pot 162 removes hydrocarbons from the gas phase 44, and afterwards the exiting wet-gas 46 is directed through two mist impingers 166 to adequately dry the gas prior to directing the dry gas 48 through one or more activated carbon filters 168. When the activated carbon filter 168 becomes exhausted, it may be treated to reactivate the carbon or, alternatively, may be disposed of according to appropriate regulatory procedures.

According to another embodiment of the invention, FIG. 2 depicts the skid arrangement of a modular apparatus 200 optimally configured for recovering the valuable hydrocarbon component of sludge 14 initially having a high concentration of high density solids. In FIG. 2 the same reference numerals are used to indicate the same skids as those previously described with respect to the apparatus 100 depicted in FIG. 1. Modular apparatus 200 comprises the pumping skid 102, the shaker skid 104, the heating skid 106, a first chemical skid 118, the decanter skid 114, a second chemical skid 120, the phase separator skid 110, the gas purification skid 112, and the oil purification skid 116. In this embodiment, two chemical skids 118, 120 are utilized with the decanter skid 114 positioned between the chemical skids 118, 120. For sludge 14 initially having a high concentration of high density solids, it is preferable to remove solids from the sludge using a decanter centrifuge prior to delivery of all the chemicals during the chemical treatment of the sludge. Skids 118 and 120 are described in more detail in the description that follows with respect to the modular apparatus 200 schematically illustrated in FIGS. 4 and 6.

Figure 6:
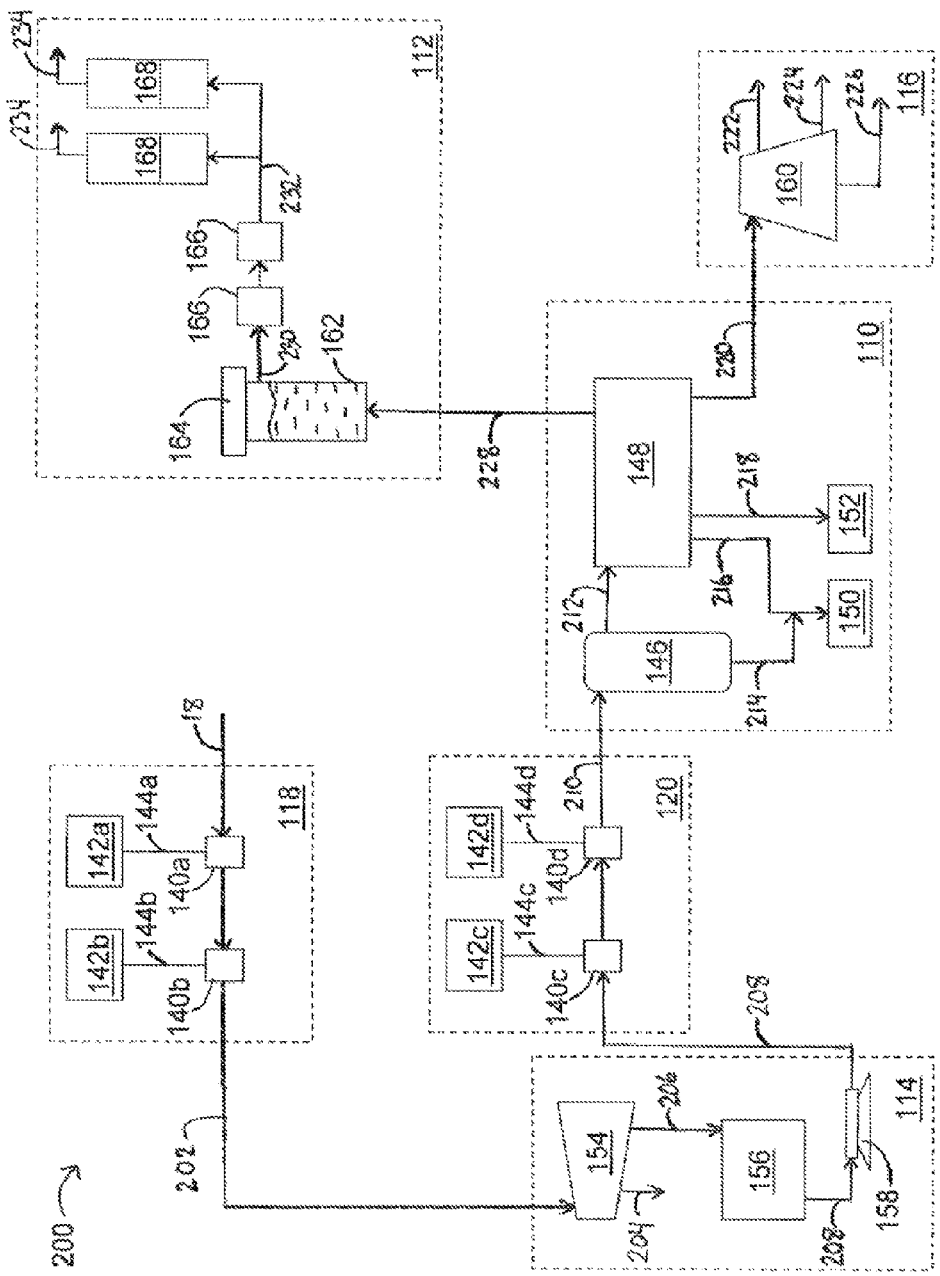

Illustrated in FIGS. 4 and 6, modular apparatus 200 processes pit sludge through the pumping skid 102, the shaker skid 104, the heating skid 106, the first chemical skid 118, the decanter skid 114, the second chemical skid 120, the phase separator skid 110, the gas purification skid 112, and the oil purification skid 116. As previously described with respect to FIG. 4, the modular apparatus 200 processes pit sludge 10 through the pumping skid 102, the shaker skid 104, and the heating skid 106 to provide a heated sludge 18.

Referring now to FIG. 6, the heated sludge 18 is transferred to the first chemical skid 118 for chemically altering the sludge 18 to break up the emulsion and promote solids separation. In FIG. 6 the same reference numerals are used to indicate the same features as those previously described with respect to apparatus 100 depicted in FIG. 5. The chemical skid 118 includes a plurality of chemical injection mixers 140a, 140b and chemical supply tanks 142a, 142b mounted thereon and within the confines of the area of the skid 118 so as to maintain the portability of the skid 118. Chemical addition is typically required to destabilize the emulsion and change such properties to facilitate separation of the solids from the sludge 18 and decrease the separation time required. Each of the chemical injection mixers 140a, 140b includes a static shear mixer having an injection point for introducing a chemical into the sludge 18 while the mixer simultaneously blends the chemical and the sludge 18 under the shearing action of the mixer. As illustrated in FIG. 6, two chemicals are added to the heated sludge 18 as the sludge is directed through the chemical injection mixers 140a, 140b. Chemical supply tanks 142a, 142b store the chemicals until they are transferred via chemical lines 144a, 144b to the mixers 140a, 140b for injection into the sludge 18. Preferably at least one dosing pump (not shown) in fluid communication with each of the chemical injection mixers 140a, 140b is used to provide a predetermined quantity of chemical to the injection point of the mixer for introduction into the sludge 18. In addition, the chemical injection mixers 140a, 140b are preferably insulated to better maintain the sludge temperature and fluidity. Once the chemicals are introduced and blended into the heated sludge 18, a first chemically-treated sludge 202 exits the last chemical injection mixer 140b and is subsequently transferred to the decanter skid 114 to separate the high density solids out of the first chemically-treated sludge 202. It should be noted that additional chemical injection mixers may be added to the first chemical skid 118 for the introduction of additional chemicals into the sludge 18.

Depending upon the particular initial sludge 14 composition, a wide variety of chemicals may be introduced and blended into the sludge 18 in order facilitate subsequent processing to separate the solids out of the first chemically-treated sludge 202. Suitable chemicals include acids, demulsifiers, wetting agents, surfactants, flocculants, and defoamers. In one example, as the heated sludge 18 travels through the first injection mixer 140a, the mixer 140a injects an acid and blends the acid with the sludge 18 therein in order to neutralize adsorbed ions present at the interfacial emulsion film of the sludge 18. Subsequently, the sludge 18 is directed through the second injection mixer 140b wherein a wetting agent is injected and blended into the sludge to alter the affinity of the solids towards the water phase. It should be noted that the present invention is not intended to be limited to the use of any particular chemicals, and other chemicals may be substituted for any of the aforementioned chemicals.

The first chemically-treated sludge 202 is directed to the decanter skid 114 for solids removal. The chemically-treated sludge 202 entering the decanter skid 114 can have a solids content as high as in the range of 6 vol. % to 15 vol. %. As previously described, the decanter skid 114 includes a decanter centrifuge 154 and a heating tank 156 mounted thereon and within the confines of the area of the skid 114. The decanter centrifuge 154 is used to reduce the solids content in the sludge 202 to a solids concentration less than about 2 vol. %. In the decanter centrifuge 154, centrifugal force causes solids 204 to separate out of the sludge 202 and coalesce for subsequent removal from the decanter through a solids outlet located in the bottom of the decanter centrifuge 154. A decanter-processed sludge 206 that exits the decanter centrifuge 154 has a solids content of less than about 2 vol. %. As previously described, suitable decanter centrifuges include decanter centrifuges having a rotational speed of 3000 rpm or greater.

After reducing the solids in the sludge 206, the decanter-processed sludge 206 is transferred to the heating tank 156 and optionally heated therein. Because a significant amount of cooling can occur during the previous processing steps since being heated in the heat exchanger 130, the decanter-processed sludge 206 may be heated to a desired temperature in the heating tank 156 in order to lower its viscosity and facilitate blending of additional chemicals into the sludge 206 during the next processing step at the second chemical skid 120. After heating, a heated decanter-processed sludge 208 is pumped via the second transfer pump 158 to the second chemical skid 120. In one example, the heated decanter-processed sludge 208 is heated to a temperature in the range from about 65° C. to about 85° C.

The heated decanter-processed sludge 208 is transferred to the second chemical skid 120 for chemically altering the sludge 208 to further break up the emulsion and promote phase separation. The chemical skid 120 includes a plurality of chemical injection mixers 140c, 140d and chemical supply tanks 142c, 142d mounted thereon and within the confines of the area of the skid 120 so as to maintain the portability of the skid 120. Chemical addition is typically required to further destabilize the emulsion and change such properties to enhance oil-water-solids phase separation during the next processing steps at the phase separator skid 110. Each of the chemical injection mixers 140c, 140d includes a static shear mixer having an injection point for introducing a chemical into the sludge 208. As illustrated in FIG. 6, two chemicals are added to the sludge 208 as the sludge travels through mixers 140c, 140d. Chemical supply tanks 142c, 142d store the chemicals until they are transferred via chemical lines 144c, 144d to the mixers 140c, 140d. Preferably at least one dosing pump (not shown) in fluid communication with each of the chemical injection mixers 140c, 140d is used to provide a predetermined quantity of chemical to the injection point of the mixer for introduction into the sludge 208. In addition, the chemical injection mixers 140c, 140d are preferably insulated to better maintain the sludge temperature and fluidity. Once the chemicals are introduced and blended into the sludge 208, a second chemically-treated sludge 210 exits the last chemical injection mixer 140d and is subsequently transferred to the phase separator skid 110. It should be noted that additional chemical injection mixers may be added to the second chemical skid 120 for the introduction of additional chemicals into the sludge 208.

Depending upon the particular sludge 208 composition, a wide variety of chemicals may be introduced and blended into the sludge to promote separation of the water, oil, and solid phases of the second chemically-treated sludge 210. Suitable chemicals include acids, demulsifiers, wetting agents, surfactants, flocculants, and defoamers. In one example, as the sludge 208 travels through the third injection mixer 140c, the mixer 140c injects a demulsifier into the sludge 208 to break the interfacial emulsion film to release the secondary water phase. Afterwards, the sludge 208 is directed through the fourth injection mixer 140d wherein a defoamer is injected and blended into the sludge for the purpose of preventing foaming. Again, it should be noted that the present invention is not intended to be limited to the use of any particular chemicals, and other chemicals may be substituted for any of the aforementioned chemicals. Furthermore, additional chemical injection mixers may be added to the second chemical skid 120 for the introduction of additional chemicals into the sludge 208.

After the second chemical treatment, the sludge 210 is directed to the phase separator skid 110 for separating water and solids from the oil phase of the sludge 210. As previously described, the phase separator skid 110 includes a surge tank 146 and a three-phase separator 148 mounted thereon. The sludge 210 is fed into the vertically-oriented surge tank 146 which separates solids from the sludge 210 and provides a continuous flow of a liquid portion of the sludge 212 to the three-phase separator 148. Separated solids 214 that settle and accumulate in a bottom region of the surge tank 146 are discharged to the solids receiving tank 150. The liquid portion of the sludge 212 which comprises oil, water, gas, and fine solids is directed to the three-phase separator 148.

The liquid portion of the sludge 212 flows into the three-phase separator 148 through an inlet located at one end of the separator 148. After phase separation within the retention section of the three-phase separator 148, a water-rich phase 218 is discharged to a water tank 152, an oil-rich phase 220 is transferred to the oil purification skid 116, and a gas phase 228 is directed to the gas purification skid 112. Any solids 216 that may settle out of the sludge 212 and accumulate in a bottom region of the separator 148 during separation of the phases are discharged to the solids receiving tank 150.

The oil-rich phase 220 is transferred to the oil purification skid 116 for final purification and recovery of oil therefrom having a BS&W of less than about 1 vol. %. As previously described, the oil purification skid 116 includes a disk stack centrifuge 160 mounted thereon. The oil-rich phase 220 is fed into the disk stack centrifuge 160 wherein extremely high centrifugal forces separate the very fine water emulsion and the ultra-fine solids out of the oil-rich phase 220. After phase separation, a water stream 222, a recovered oil stream 224, and an ultra-fine solids phase 226 are discharged from the centrifuge 160. The recovered oil stream 224 has a BS&W less than about 1 vol. % and is commercially marketable.

The gas phase 228 is transferred to the gas purification skid 112 where the gas phase 228 is treated to remove VOCs prior to discharge into the environment. As previously described, the gas purification skid 112 preferably includes a free water knockout pot 162, at least one mist impinger 166, and at least one activated carbon filter 168 mounted thereon. A VFD-controlled vacuum blower 164 attached to the knockout pot 162 is used to draw the gas phase 228 from a gas vent located in an upper side of the three-phase separator 148 through the knockout pot 162 filled with water. Hydrocarbons in the gas phase 228 adhere to the water as the gas travels upwardly through the pot 162. A wet-gas 230 that exits a gas outlet near the top of the knockout pot 162 is directed through at least one mist impinger 166 to remove water from the gas 230 and provide a dry gas 232. The dry gas 232 is transferred to an activated carbon filter 168 to remove contaminants (e.g., remaining VOCs) therefrom in order to ensure a gas 234 that meets the regulatory standards for release to the atmosphere.

According to still another embodiment of the invention, FIG. 3 depicts the skid arrangement of a modular apparatus 300 optimally configured for recovering the valuable hydrocarbon component of sludge 14 initially having a low concentration of solids. In FIG. 3 the same reference numerals are used to indicate the same skids as those previously described with respect to the apparatus 100 depicted in FIG. 1. Modular apparatus 300 comprises the pumping skid 102, the shaker skid 104, the heating skid 106, the chemical skid 108, the phase separator skid 110, the gas purification skid 112, and the oil purification skid 116. This embodiment excludes the use of the decanter skid 114. For sludge 14 initially having a low concentration of solids, it may be unnecessary to include a decanter centrifuge for the removal of solids.

Figure 7:
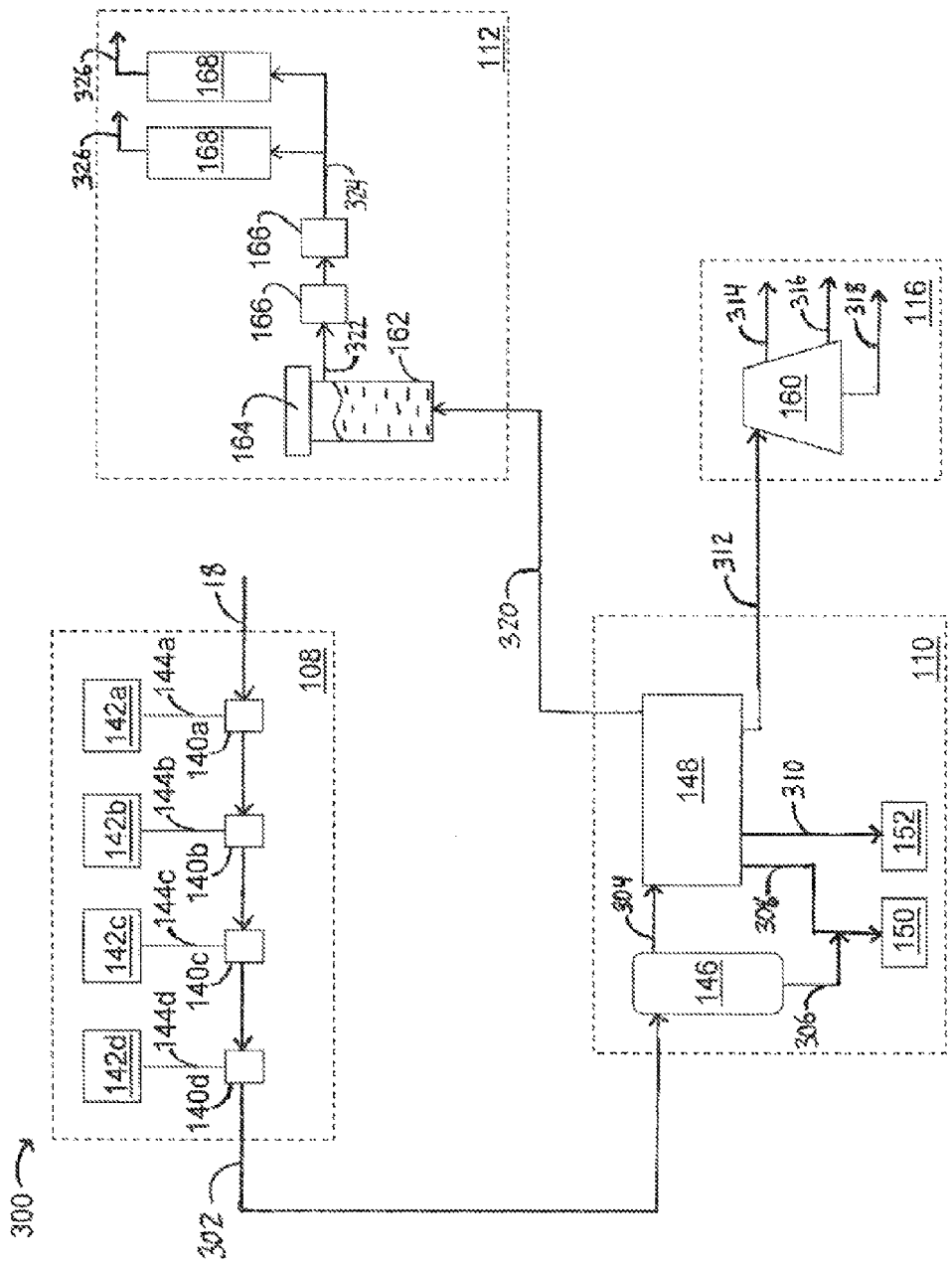

Illustrated in FIGS. 4 and 7, modular apparatus 300 processes pit sludge through the pumping skid 102, the shaker skid 104, the heating skid 106, the chemical skid 108, the phase separator skid 110, the gas purification skid 112, and the oil purification skid 116. As previously described with respect to FIG. 4, the modular apparatus 300 processes pit sludge 10 through the pumping skid 102, the shaker skid 104, and the heating skid 106 to provide a heated sludge 18.

Referring now to FIG. 7, the heated sludge 18 is transferred to the chemical skid 108 for chemically altering the sludge 18 to break up the emulsion and promote phase separation. In FIG. 7 the same reference numerals are used to indicate the same features as those previously described with respect to apparatus 100 depicted in FIG. 5. As previously described, the chemical skid 108 includes a plurality of chemical injection mixers 140a-d and chemical supply tanks 142a-d mounted thereon. Chemical addition is typically required to destabilize the emulsion and change such properties of the sludge 18 to enhance the its phase separation during the next processing step at the phase separator skid 110. As previously described, each of the chemical injection mixers 140a-d includes a static shear mixer having an injection point for introducing a chemical into the sludge 18 while the mixer simultaneously blends the chemical and the sludge 18 under the shearing action of the mixer. As illustrated in FIG. 7, four chemicals are added to the heated sludge 18 as the sludge is directed through the chemical injection mixers 140a-d. Chemical supply tanks 142a-d store the chemicals until they are transferred via chemical lines 144a-d to the mixers 140a-d for injection into the sludge 18. Preferably at least one dosing pump (not shown) in fluid communication with each of the chemical injection mixers 140a-d is used to provide a predetermined quantity of chemical to the injection point of the mixer for introduction into the sludge 18. Preferably, chemical injection mixers 140a-d are thermally insulated to better maintain the sludge temperature and fluidity. Once the chemicals are introduced and blended into the heated sludge 18, a chemically-treated sludge 302 exits the last chemical injection mixer 140d and is subsequently transferred to the phase separator skid 110 for separating the water, oil and solid phases of the sludge 302. Again, it should be noted that additional chemical injection mixers may be added to the chemical skid 108 for the introduction of additional chemicals into the sludge 18.

After chemical treatment, the sludge 302 is directed to the phase separator skid 110 for separating water and solids from the oil phase of the sludge 302. As previously described, the phase separator skid 110 includes a surge tank 146 and a three-phase separator 148 mounted thereon. The sludge 302 is fed into the vertically-oriented surge tank 146 which contains an interior plate that facilitates the small solids within the sludge to aggregate and form larger solids that settle out of the sludge 302 and accumulate in a bottom region of the surge tank 146. Separated solids 306 that accumulate in the surge tank 146 are discharged to the solids receiving tank 150. The surge tank 146 also provides a continuous flow of a liquid portion of the sludge 304 to the three-phase separator 148 for oil, water, gas, and solid phase separation.

The liquid portion of the sludge 304 flows into the three-phase separator 148 through an inlet located at one end of the separator 148. After phase separation within the retention section of the three-phase separator 148, a water-rich phase 310 is discharged to a water tank 152, an oil-rich phase 312 is transferred to the oil purification skid 116, and a gas phase 320 is directed to the gas purification skid 112. Any solids 308 that may settle out of the sludge 304 and accumulate in a bottom region of the separator 148 during separation of the phases are discharged to the solids receiving tank 150.

The oil-rich phase 312 is transferred to the oil purification skid 116 for final purification and recovery of oil therefrom having a BS&W of less than about 1 vol. %. As previously described, the oil purification skid 116 includes a disk stack centrifuge 160 mounted thereon. The oil-rich phase 312 is fed into the disk stack centrifuge 160 wherein extremely high centrifugal forces separate the very fine water emulsion and the ultra-fine solids out of the oil-rich phase 312. After phase separation, a water stream 314, a recovered oil stream 316, and an ultra-fine solids phase 318 are discharged from the centrifuge 160. The recovered oil stream 316 has a BS&W less than about 1 vol. % and is commercially marketable.

The gas phase 320 is transferred to the gas purification skid 112 where the gas phase 320 is treated to remove VOCs prior to discharge into the environment. As previously described, the gas purification skid 112 preferably includes a free water knockout pot 162, at least one mist impinger 166, and at least one activated carbon filter 168 mounted thereon. A VFD-controlled vacuum blower 164 attached to the knockout pot 162 is used to draw the gas phase 320 from a gas vent located in an upper side of the three-phase separator 148 through the knockout pot 162 filled with water. Hydrocarbons in the gas phase 320 adhere to the water as the gas travels upwardly through the pot 162. A wet-gas 322 that exits a gas outlet near the top of the knockout pot 162 is directed through at least one mist impinger 166 to remove water from the gas 322 and provide a dry gas 324. The dry gas 324 is transferred to an activated carbon filter 168 to remove contaminants (e.g., remaining VOCs) therefrom in order to ensure a gas 326 that meets the regulatory standards for release to the atmosphere.

While the foregoing is directed to embodiments of the present invention, other and further embodiments of the invention may be devised without departing from the basic scope thereof, and the scope thereof is determined by the claims that follow.

What is claimed is:

1. A method for recovering oil from an emulsified oil-based sludge comprising:
    homogenizing an oil-rich phase, a water-rich phase, and a solids-rich phase of an emulsified oil-based sludge on a pumping skid;
    transferring the sludge from the pumping skid to a shaker skid;
    removing particulates from the oil-based sludge as the sludge traverses a shaker screen on the shaker skid;
    transferring the sludge from the shaker skid to a heating skid;
    heating the sludge on the heating skid;
    transferring the sludge from the heating skid to a chemical skid;
    injecting a chemical into the heated sludge and mixing the chemical with the heated sludge on the chemical skid, wherein the chemical includes at least one demulsifier;
    transferring the sludge from the chemical skid to a phase separation skid;
    separating the phases of the chemically-treated sludge into a solids component stream, a water component stream, a first oil component stream, and a gas component stream on the phase separation skid;
    transferring the first oil component stream from the phase separation skid to a decanter skid;
    removing solids from the first oil component stream with a decanting centrifuge to form a second oil component stream on the decanter skid;
    transferring the second oil component stream from the decanter skid to a oil purification skid; and
    removing water and solids from the second oil component stream with a disk stack centrifuge to form a third oil component stream on the oil purification skid.

2. The method of claim 1, wherein heating the sludge comprises heating the sludge to a temperature in the range of about 65° C. to about 85° C.

3. The method of claim 1, wherein heating the sludge comprises heating the sludge to a temperature in the range of about 70° C. to about 80° C.

4. The method of claim 1, wherein the chemical injected into the heated sludge is selected from the group consisting of acids, demulsifiers, wetting agents, surfactants, flocculants, defoamers and combinations thereof.

5. The method of claim 1, wherein the chemical injected into the heated sludge is selected from the group consisting of acids, demulsifiers, wetting agents, surfactants, flocculants, defoamers, pour point suppressant and combinations thereof.

6. The method of claim 1 further comprising providing a steady state flow rate of sludge to the heating step using a holding tank.

7. The method of claim 1 further comprising separating solids from the chemically treated sludge with a surge tank.

8. The method of claim 1 further comprising heating the second oil component stream.

9. The method of claim 8, wherein the second oil component stream is heated to a temperature in the range of about 65° C. to 85° C.

10. The method of claim 1 further comprising removing hydrocarbons from the gas component stream with a free water knockout pot and activated carbon filter.

11. The method of claim 1 further comprising removing solids and water from the first oil component stream so that the second oil component stream has a Basic Sediment and Water content of less than 2% by volume.

12. The method of claim 1 further comprising removing solids and water from the second oil component stream so that the third oil component stream has a Basic Sediment and Water content of less than 1% by volume.

* * * * *